United States Patent [19]
Dews et al.

[11] 3,801,374
[45] Apr. 2, 1974

[54] GRAPHITE AND VINYLIDENE FLUORIDE STRUCTURES FOR FUEL CELLS

[75] Inventors: George H. Dews, Glastonbury; Raymond W. Vine, Bolton, both of Conn.

[73] Assignee: United Aircraft Corporation, East Hartford, Conn.

[22] Filed: Jan. 8, 1969

[21] Appl. No.: 789,777

[52] U.S. Cl. ............................ 136/120 FC, 136/121
[51] Int. Cl. .......................................... H01m 13/02
[58] Field of Search ............ 136/121, 122, 120, 86, 136/22, 143, 146; 264/104, 105; 252/511

[56] References Cited
UNITED STATES PATENTS

| | | |
|---|---|---|
| 977,984 | 12/1910 | Tone .............................. 136/121 X |
| 2,230,267 | 2/1941 | Ruben ............................ 136/121 X |
| 2,605,300 | 7/1952 | Shirland .............................. 136/121 |
| 3,413,239 | 11/1968 | Olstowski et al. .............. 136/121 X |
| 3,415,689 | 12/1968 | Carson et al. ...................... 136/120 |
| 3,423,246 | 1/1969 | Prager et al. ...................... 136/120 |
| 3,432,353 | 3/1969 | Kausenstierna et al. ............... 136/86 |

*Primary Examiner*—Anthony Skapars
*Attorney, Agent, or Firm*—Laurence A. Savage

[57] ABSTRACT

A corrosion resistant coolant and support plate molded from graphite powder and vinylidene fluoride is disclosed for use in acid electrolyte fuel cells. A limited amount of vinylidene fluoride is used to obtain the structural characteristics so that thermal and electrical conductivity may be maintained at a satisfactory level.

2 Claims, 2 Drawing Figures

PATENTED APR 2 1974

3,801,374

INVENTORS
GEORGE H. DEWS
RAYMOND W. VINE

BY Edmund C. Meisinger

ATTORNEY

GRAPHITE AND VINYLIDENE FLUORIDE STRUCTURES FOR FUEL CELLS

BACKGROUND OF THE INVENTION

This invention relates to a structure for use in acid electrolyte fuel cells. More specifically, this invention deals with a molded graphite and vinylidene fluoride resin binder structure particularly suitable for use as coolant and support plates in corrosive acid electrolyte fuel cells.

Materials for coolant plates for service in acid electrolyte fuel cells are limited by the severe corrosion which is characteristic of most materials in this media. Gold-plated copper and other plated materials have been used but are expensive and have various limitations. Initial acid fuel cell designs operated at 150° to 200° F to minimize material compatibility problems. If the cells are operated above 200° F, corrosion problems associated with the acid electrolyte increase but a number of benefits are realized. Graphite structures appear to be the most promising for use in the acid electrolyte fuel cells. These structures must be gas impervious when employed to form the gas chambers for containing the fuel and oxidant in close relationship with the cell electrodes. Previously, the graphite structures have been machined to the desired configuration from graphite blanks removed from a billet. Experience has shown that machining is expensive and the desired configurations were limited due to machining requirements. In addition, most graphite blanks are non-uniform and require impregnation to reduce porosity. Electrode support structures often form part of the electrical circuitry in a module of fuel cells, and the fuel cell temperature is often regulated by conducting heat through these structures to a coolant or an external fin. It is imperative that these structures be corrosion resistant in an acid electrolyte environment.

In selecting a structure to serve as a support plate in an acid electrolyte cell, its resistance to corrosion under the operating conditions of the device is an important consideration. As a rigid support structure and part of the gas chamber, the graphite structure must be impervious to hydrogen and other gases.

SUMMARY OF THE INVENTION

An object of this invention is to provide a coolant or support plate composition applicable to acid electrolyte fuel cells.

Another object of this invention is the provision of a molded homogeneous graphite and vinylidene fluoride structure which is gas impervious, conductive, and corrosion resistant.

A feature of this composition lies in its ability to be readily molded into plates having complex shapes while providing satisfactory, if not improved, strengths and toughness.

Structures molded from graphite powder and vinylidene fluoride should be gas impervious and should not deteriorate during extended service with acid electrolytes. Preferably, the structure has incorporated therein about 5 to 15 percent by weight of vinylidene fluoride and 85 to 95 percent by weight graphite powder.

Other objects and advantages of the present invention become more apparent from the following detailed description of a preferred embodiment thereof and from the accompanying drawings.

DESCRIPTION OF THE PREFERRED EMBODIMENT

Figure 1:
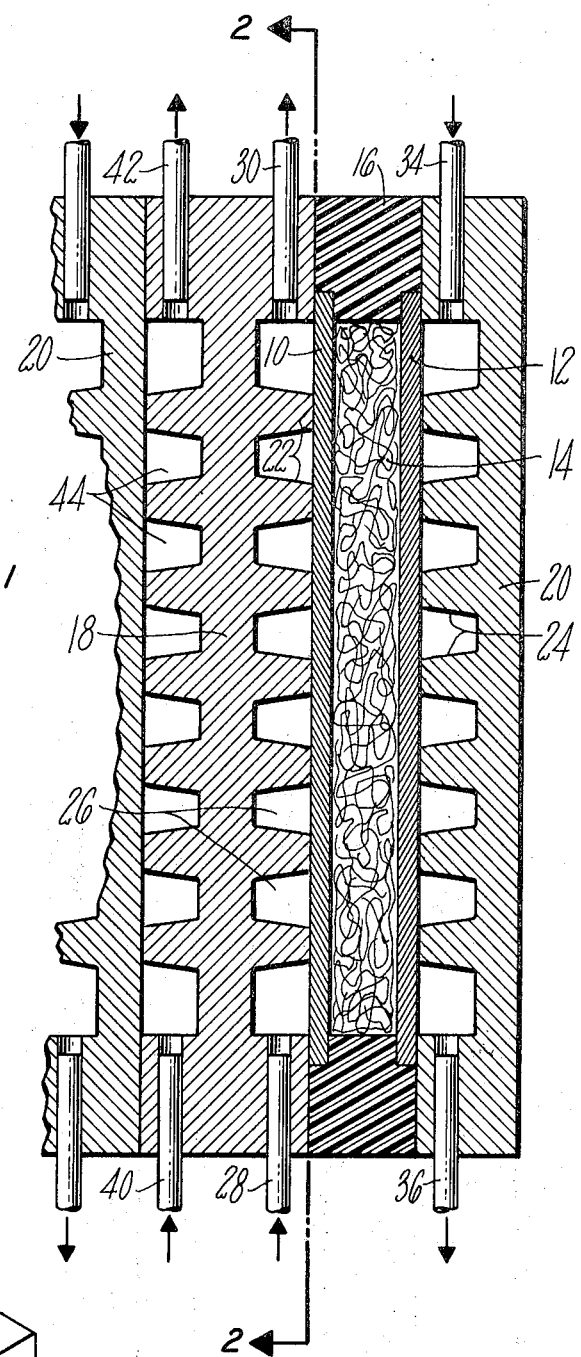
FIG. 1 is a schematic illustration of a portion of an acid electrolyte fuel cell module.

Referring to FIG. 1, an acid fuel cell is shown having a pair of plates and a spacer therebetween. The cell is shown having an anode 10 and a cathode 12 referred to herein as electrodes. A matrix 14 contains an acid electrolyte which may be, for example, phosphoric acid or sulfuric acid. The matrix 14 is surrounded by the insulating spacer 16 and enclosed by the electrodes 10 and 12. The electrodes 10 and 12 fit snugly into grooves on the inner periphery of the spacer. The plates 18 and 20 are mounted around the periphery of the electrodes with the plates overlapping the outside edges of the electrodes so as to securely retain the electrodes and matrix therein. Additional support of the electrodes and matrix is provided by the inwardly projecting pegs 22 and 24. The plate 18 defines a fuel chamber 26 having a fuel inlet 28 and a fuel outlet 30. Similarly, the plate 20 defines an oxidant chamber 32 having an inlet 34 and an outlet 36. Plate 18 is shown as serving the additional function of providing a cooling chamber 44 having an inlet 40 and outlet 42. Cell temperature control is provided by ducting air or water into and out of chamber 44. This invention contemplates the fabrication of a dense graphite support plate or coolant plate construction or combination thereof. The plates should be conductive since the plates often form part of the electrical circuit in a fuel cell module.

In accordance with this invention, vinylidene fluoride is dissolved in the liquid solvent methylisobutylketone. A slurry is prepared by blending graphite powder into the mixture. The mixture is air and vacuum dried to remove the solvent. A predetermined amount of the dried mixture is loaded into a steel mold. Pressures of about 3,000 psi are applied while the mold and contents are heated to about 400° F. Full heat and pressure is maintained for a sufficient length of time to make certain that the entire mass has uniformly attained the proper temperature.

Vinylidene fluoride is a tough, hard, thermoplastic resin which dissolves in methylisobutylketone. A thin vinylidene fluoride coating is provided over each graphite particle resulting in a better bond than would be achieved by a blend of graphite particles and a binder in particle form. Once molded, satisfactory electrical and thermal conductivities are achieved if the quantity of vinylidene fluoride in the structure is limited. Although structures bonded with a thermoplastic soften at elevated temperatures and normally would not be considered as a potential binder material, structures molded from the mixture of graphite powders and vinylidene fluoride will be found to be useful in acid electrolyte fuel cells. A sufficient amount of vinylidene fluoride is required to provide adequate strength and bond but electrical and thermal resistance of the molded structure increases as the amount of binder is increased. Consequently, the optimum amount of vinylidene fluoride in the structure should be about 5 to 15 percent. The advantage of this particular composition lies in its suitability to the acid electrolyte fuel cell. Vinylidene fluoride is particularly effective as a binder since it dissolves in methylisobutylketone and, when mixed with graphite, can coat every graphite particle. A bond is provided and porosity is decreased as the vinylidene fluoride is redistributed within the interstices between the graphite particles during heat pressing.

Figure 2:
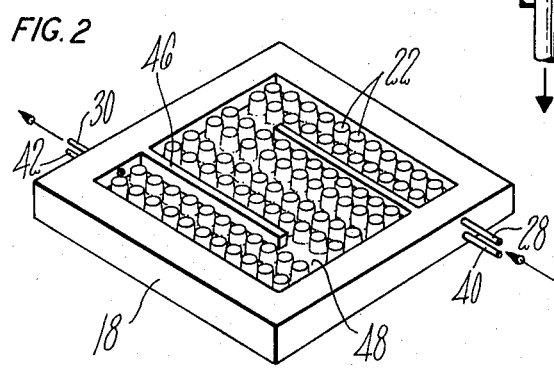
FIG. 2 is a perspective view of a coolant and support plate taken along lines 2—2 of FIG. 1.

The composition lends itself to molding graphite plates having pegs 22, ribs 46, and channels 48 as shown in FIG. 2. A potential means of simplifying the fuel cell is to integrate the support plate and the coolant plate and this invention contemplates such a structure.

The feasibility of a pressed vinylidene fluoride bonded graphite structure was clearly demonstrated by the following example. A plate was pressed from a mixture of 88 weight percent graphite powder and 12 weight percent vinylidene fluoride. The mixture was prepared by blending 200 ml of methylisobutylketone solvent with 88 grams of graphite powder and 12 grams of vinylidene fluoride. First the vinylidene fluoride was dissolved in the solvent and the graphite particles were blended into the solution. The mixture was then air and vacuum dried to remove the solvent. Pressing was accomplished by charging a steel mold with the required amount of the dried mixture. A release agent was applied to the steel mold prior to loading the mold. A pressure of about 3,000 psi was supplied and the mold and contents were heated to about 400° F. Thereafter, the mold and contents were cooled to room temperature with the pressure applied and the pressed structure was removed from the mold. This sample had longitudinal ribs and channels and was approximately 4 inches by 4 inches and 0.4 inch thick. Measurements on the sample disclosed a density of 2.0 g/cc and a $4 \times 10^{-3}$ ohm-centimeter resistivity. This example demonstrates the feasibility of fabricating complex structures directly from a moldable graphite and vinylidene fluoride composition. The objective of achieving a non-porous structure (i.e., generally a density of 1.8 g/cc or better) has easily been met. In addition, the structure will be found to provide excellent corrosion resistance in acid electrolytes at temperatures above 200° F for extended periods of time.

Although the invention has been shown and described with respect to a preferred embodiment, it should be understood by those skilled in the art that various changes and omissions in the form and detail may be made therein without departing from the spirit and scope of the invention.

We claim:

1. A gas impervious, electrically and thermally conductive plate for use in acid electrolyte fuel cells comprising a molded structure consisting of, by weight, 85 to 95 percent graphite and 5 to 15 percent vinylidene fluoride.

2. A plate as in claim 1 wherein the structure is composed of an intimate mixture of about 88 weight percent graphite and about 12 weight percent vinylidene fluoride.

* * * * *